Dec. 7, 1965     M. BOBO     3,222,017
ENGINE MOUNTING
Filed March 30, 1964                2 Sheets-Sheet 1
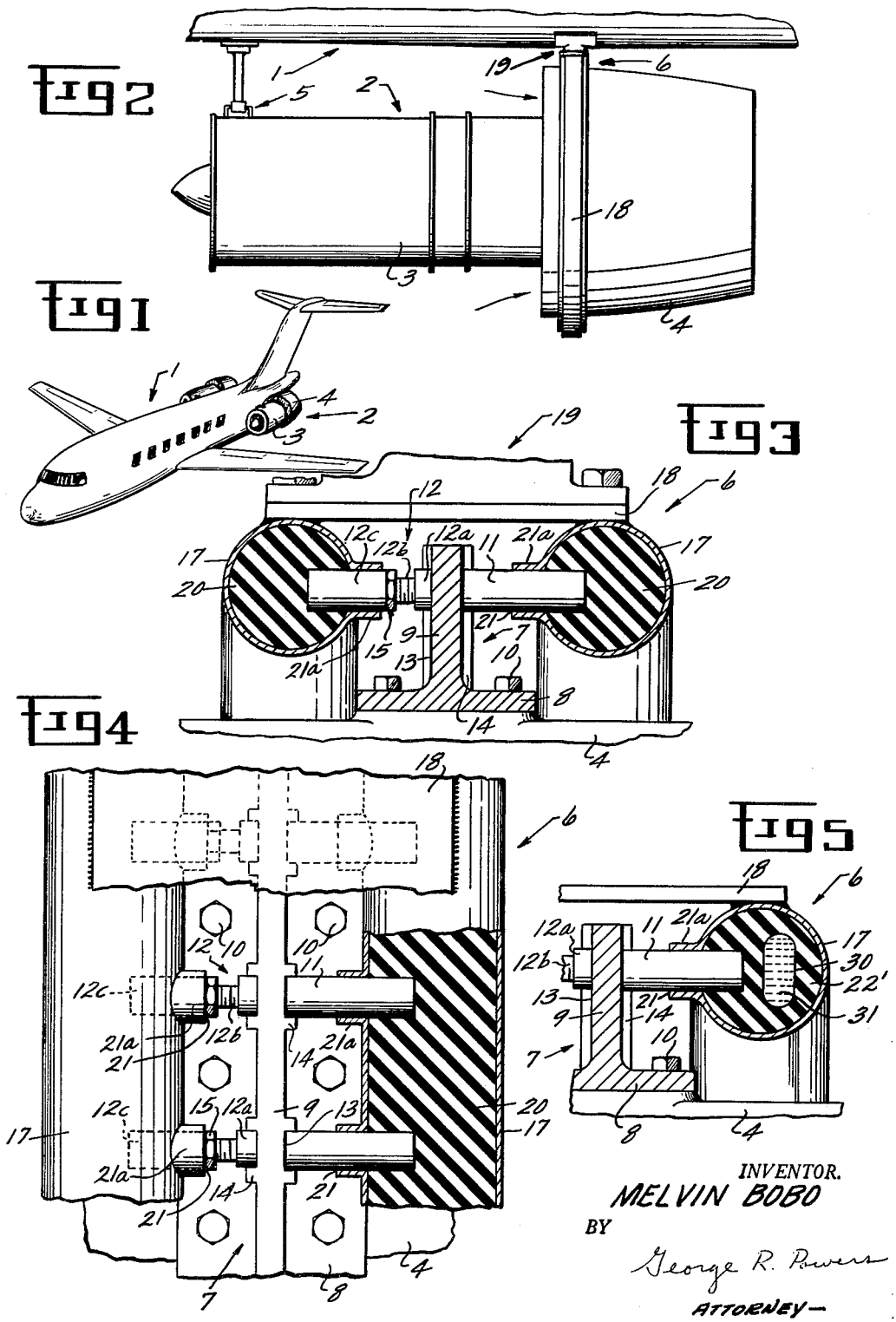
INVENTOR.
MELVIN BOBO
BY
George R. Powers
ATTORNEY Dec. 7, 1965  M. BOBO  3,222,017
ENGINE MOUNTING
Filed March 30, 1964  2 Sheets-Sheet 2

INVENTOR.
MELVIN BOBO
BY
George R. Powers
ATTORNEY

United States Patent Office 3,222,017
Patented Dec. 7, 1965

3,222,017
ENGINE MOUNTING
Melvin Bobo, Topsfield, Mass., assignor to General
Electric Company, a corporation of New York
Filed Mar. 30, 1964, Ser. No. 355,687
9 Claims. (Cl. 248—5)

This invention relates to an aircraft engine mounting arrangement and, more particularly, to a jet propulsion engine mounting arrangement in which the thrust produced by the engine and transmitted to the airframe is distributed among the structural members of the engine in a manner such that stresses and deflections are minimized.

The mounting arrangement which connects an aircraft engine to the airframe must be capable of securely supporting the engine under all operating conditions. To accomplish this, the mounting arrangement must be such that the laws of statics relative to the summations of forces and moments in three principal directions are satisfied. These principles are usually stated as $\Sigma F=0$ and $\Sigma M=0$. Thus, in order to maintain the engine in equilibrium, the mounting arrangement must be capable of developing reaction forces and moments in the three principal directions to counteract forces and moments otherwise acting on the engine. It is well known that the laws of statics may be satisfied by six suitable restraints such as forces of suitable direction, magnitude, and separation acting through suitably spaced support points. Any reaction forces in addition to those actually needed may produce what is known as a statically indeterminant or redundant structure. Such a structure increases the complexity of the mounting arrangement and the possibility of reduced engine performance or damage due to unforeseen distortion since adjustment to relieve strains is more difficult.

Most mounting arrangements presently in use for supporting jet propulsion engines are of the type in which six reaction forces act through three spaced points to form a statically determinant system. The spaced support points are preferably located on relatively rigid portions of the engine, such as adjacent the outer tips of the internal radial support struts. While these mounting arrangements result in statically determinate force systems relative to the engine and aircraft assembly as a whole, the forces acting through the individual support points are characteristically entirely independent of the physical characteristics of either the engine or the airframe. Thus, physical characteristics such as local distortion, stiffness, thermal expansion, etc., have no bearing upon the magnitudes of the loads transmitted through the support points, the individual forces being uniquely determined by the maneuver and thrust loads produced during aircraft operation.

It is customary to transfer the entire axial thrust produced by a jet engine to the airframe at one or two of the spaced support points. The transfer of the entire axial thrust produced to the airframe through one or two support points on the engine periphery results in unequal distribution of thrust forces within the engine frame. More particularly, the internal radial struts in the vicinity of the thrust removal points are highly stressed while the other struts are subjected to little load. It will be obvious that this localized stress is greatest when the entire thrust is transmitted through a single point. In conventional turbojet engines having relatively small diameters, the radial frame struts can often take this unequal loading without deflecting appreciably. In fan engines having relatively large diameters, however, weight considerations demand that the long internal struts be of lightweight construction. As a result, the frame structures of fan engines are more flexible than those of conventional non-fan jet engines, and unequal loading in a fan engine can cause substantial deflections of the struts in the vicinity of the thrust removal points. This deflection of the frame has deleterious effects on blade and seal clearances which in turn result in greater leakage and poorer engine performance.

It is a primary object of this invention to provide an improved engine mounting arrangement in which the structural elements of the engine are subjected to minimized stresses and deflections.

Another object of the present invention is to provide an improved engine mounting arrangement in which the axial thrust forces produced by the engine are distributed in a uniform manner to structural elements of the engine while maintaining a statically determinant system.

A further object of the present invention is to provide an engine mounting in which thrust forces are distributed in a substantially uniform manner circumferentially about the engine.

Further objects and advantages of the invention will become apparent and the features of novelty which characterize the invention will be pointed out with particularity in the claims annexed to and forming part of this specification.

Briefly stated, in accordance with the illustrated embodiment of the invention, a jet propulsion engine is provided with mounting structure secured to and circumferentially disposed about the engine, the mounting structure being axially spaced from a substantially closed load member also circumferentially surrounding the engine. The load member is secured to and, in essence, is actually part of the airframe when considered with respect to the engine. A plurality of axially extending plungers are secured to the mounting structure and extend through openings in the load member into contact with a force-transmitting medium entirely enclosed within the load member. Since the plungers are uniformly spaced about the engine periphery and since the force transmitting medium equalizes the axial thrust forces carried by the various plungers, the total thrust is distributed uniformly to the structural elements of the engine.

For a better understanding of this invention, reference may be had to the accompanying drawings in which:

FIG. 1 is a perspective view of an aircraft including engines mounted in accordance with one embodiment of this invention;

FIG. 2 is a plan view of a mounting arrangement in accordance with the embodiment illustrated by FIG. 1;

FIG. 3 is an enlarged plan view, partly in section, of a portion of the mounting arrangement adjacent to the fuselage;

FIG. 4 is a plan view, partially in cross-section;

FIG. 5 is a partial view similar to FIG. 3 showing a second embodiment of this invention;

Figure 6:
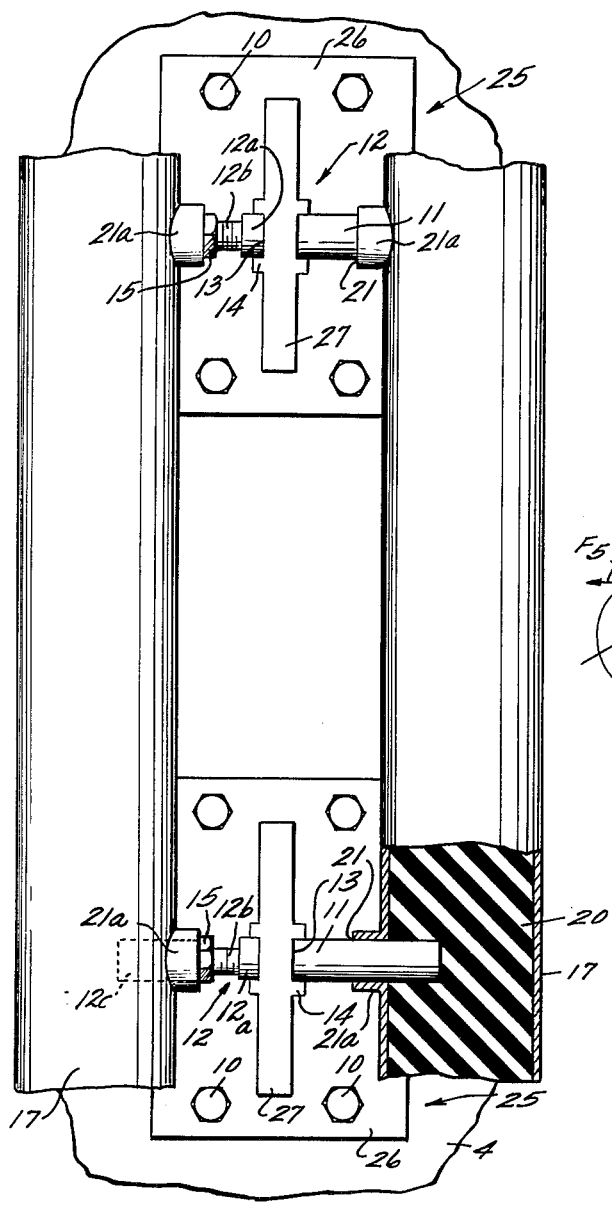
FIG. 6 is a view, partially in cross-section, similar to FIG. 4 showing a third embodiment of this invention.

FIG. 1 illustrates an aircraft assembly including a fuselage 1 having a pair of jet propulsion engines 2 of the aft-fan type mounted thereon. As best shown by FIG. 2, an aft-fan engine typically has an engine casing structure formed of two portions, a gas generator casing 3 and a fan casing 4. The gas generator casing 3 encloses a compressor, a combustion chamber, and a turbine, while the fan casing 4 encloses a fan and its power turbine. These internal elements are well-known in the art. The fan casing 4, which is located aft of the gas generator casing 3, has a larger diameter than the gas gas generator casing in order to admit ambient or bypass air into the interior of the fan casing in addition to those gases which flow through the gas generator casing.

The novel mounting arrangement connecting the individual aft-fan engines 2 to the fuselage 1 of the airframe will now be described. The entire axial thrust produced by the engine is transmitted through a thrust distributing mounting which completely surrounds the periphery of the fan casing 4, the thrust mounting being indicated generally by the numeral 6 in FIGS. 2–4. The thrust mounting 6 includes a circumferential thrust ring 7 having a base portion 8 and a radial, outwardly extending flange 9. The base portion 8 is secured to the fan casing 4 by a number of bolts 10. The flange 9 is a substantially solid member having a plurality of radial grooves 13 therein formed between shoulders 14, each of the grooves 13 being adapted to receive an axial plunger. Two types of plungers are illustrated, the first type 11 comprising a cylindrical member having a smooth outer surface while the second type is a multi-element structure indicated generally by the number 12. Each of the multi-element plungers 12 is comprised of a first cylindrical portion 12a having a threaded shank portion 12b which is received in a second cylindrical portion 12c. The shank portion 12b can be screwed into or out of the second cylindrical portion 12c to vary the length of the plunger 12. A lock nut 15 mounted on the shank portion 12b can be tightened up against the cylindrical portion 12c to hold the plunger parts in fixed relationship and thereby fix the length of the plunger 12.

In addition to the thrust ring 7 and the plungers 11 and 12, the thrust distributing mounting 6 includes a pair of hollow ring-like or toroidal load members 17 which also circumferentially surround the fan casing 4, one of the load members 17 being spaced axially upstream of the thrust ring flange 9 and the other axially downstream. The load members 17 are secured to a circumferential supporting plate 18, preferably by welding, so that the load members 17 and the supporting plate 18 together form a substantially rigid structure which can be secured to the fuselage 1 by conventional means. As illustrated by FIGS. 2 and 3, the connection 19 between the plate 18 and the fuselage 1 may be a bolted arrangement. As this description proceeds, it will become clear that, so far as the engine is concerned, the rigid intermediate structure comprised of the load members 17 and the supporting plate 18 forms a portion of the airframe on which the engine 2 is mounted. In other words, the engine 2 can be mounted in a statically determinant manner even though this intermediate structure may be secured to the fuselage 1 in a statically indeterminate or redundant manner.

Each of the load members 17 is completely filled with a force transmitting medium 20 which is preferably a body of resilient material such as rubber. The load members 17 are provided with a plurality of openings 21 for receiving the ends of the plungers 11 and 12, there being one opening 21 for each plunger just as there is one radial groove 13 for each plunger. The openings 21 are defined by axially extending tubular walls 21a which also serve as guides to maintain the axial positioning of the plungers 11 and 12 at all times. The plungers 11 and 12, the radial grooves 13, and the axial openings 21 are uniformly spaced about the engine periphery. The plungers 11 and 12 extend axially through the openings 21 and are seated in the resilient material 20, the plungers 11 and 12 having a close sliding fit with the tubular walls 21a in order to prevent extrusion of the resilient material between the outer surfaces of the plungers and the walls 21a. When a highly resilient material such as rubber is completely enclosed as it is in the structure illustrated, it exhibits many of the characteristics of a fluid. For example, it is difficult to compress, and it will exert a nearly uniform hydrostatic pressure distribution on the walls of its container when it is placed under a compressive load.

To initially mount the engine 2, the smooth plungers 11 are inserted through the openings 21 in one of the load members 17 and are received in the associated radial grooves 13 in the thrust ring flange 9. The plungers 11 are held in their axial positions by the tubular walls 21a. Similarly, the cylindrical portions 12c of the multi-element plungers 12 are inserted through the openings 21 in the other load member 17 and the cylindrical portions 12a are positioned in their associated radial grooves 13. By means of the shank portions 12b and the lock nuts 15, the lengths of the plungers 12 are fixed so as to place the resilient force transmitting medium 20 in each of the load members 17 under relatively slight compression. As with the plungers 11, the tubular walls 21a maintain the axial alignment of the plungers 12.

During engine and aircraft operation, the thrust produced by the engine 2 is transmitted through the thrust distributing mounting 6 to the fuselage 1. More particularly, the thrust is transmitted through the thrust ring 7 and one of the sets of plungers to one of the load members 17 of the rigid intermediate structure. Forward thrust is transmitted through the multi-element plungers 12 while reverse thrust is transmitted through the single element plungers 11. Assuming for a moment that forward thrust is being produced, it will be clear that equal thrust forces are transmitted through each of the plungers 12 since each has equal cross-sectional area and the force transmitting medium acts as a fluid, i.e., it displays a substantially uniform hydrostatic pressure distribution. Furthermore, since each of the thrust forces is in the axial direction and since the plungers 12 are uniformly spaced about the engine periphery, the plurality of thrust forces are equivalent to a single force having a magnitude equal to the entire thrust and acting through the centroid of the forces, which is, of course, the axial centerline of the engine 2. Thus, although the thrust is equally distributed between the plungers 12 and the internal structural elements of the engine 2 are uniformly stressed, the net result is, with respect to the static equilibrium of the engine, equivalent to one axial force acting along the axial center line of the engine. Reverse thrust is transmitted in an entirely similar manner.

The thrust distributing mounting 6 also supports the engine 2 in the vertical and lateral directions and prevents roll about the engine axis. Stated in a simplified manner, vertical loads are transmitted from the shoulders 14 of substantially horizontal ones of the grooves 13 to the associated ones of the plungers while lateral loads are transmitted through vertical ones of the shoulders 14. Components of these forces are, of course, similarly transmitted through inclined ones of the shoulders 14. Again, since these forces are distributed in a substantially uniform manner about the engine periphery, the net result is, with respect to engine equilibrium, substantially equivalent to a single force acting through the centroid of the force system, or through the engine axis. This single force can be resolved into vertical and lateral components. Any tendency for the engine 2 to roll about its axis is prevented by reaction forces between the plungers 11 and 12 and the radial shoulders 14 of the associated radial grooves 13. Since, however, the grooves 13 are all radial, there is nothing to prevent uniform relative radial movement between the engine 2 along with the thrust ring 7 and the portions including the plungers 11 and 12 and the rigid intermediate structure of the thrust distributing mounting 6. It will thus be seen that the thrust distributing mounting does not interfere with thermal expansion and contraction of the engine 2.

Figure 7:
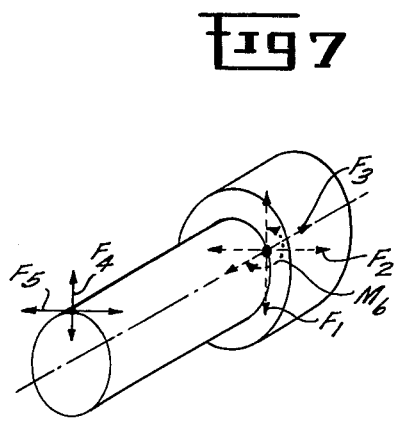
FIG. 7 is a schematic diagram illustrating the force distribution of the mounting arrangement of FIGS. 1 through 6.

It will be obvious from the foregoing that the force distribution provided by the thrust distributing mounting 6 assures that the total loads will be shared equally by the structural members of the engine. In this manner, no element is subjected to excessive loads or deflections that could result in substantial leakage and poor engine performance. At the same time, however, it will be obvious that this force distribution does not result in a statically indeterminate or redundant system. With respect to static equilibrium of the engine, the thrust distributing mounting is equivalent to a single mounting point on the engine centerline, the mounting being capable of transmitting forces $F_1$, $F_2$, and $F_3$ in the vertical, lateral, and axial directions, respectively, and preventing roll about the engine axis by being capable of reacting to a moment $M_6$. This is schematically illustrated by FIG. 7. The statically determinant mounting arrangement is completed by a mount 5 connected to the gas generator casing 3 which is capable of transmitting vertical and horizontal forces $F_4$ and $F_5$ respectively. The engine 2 is not restrained in the axial direction at the mount 5 and is, therefore, free to expand and contract axially.

FIG. 5 reveals a second embodiment of this invention in which at least one of the load members 17 is filled with a body of resilient material 22' having a ring-like cavity 30. The ring-like cavity 30 is filled with hydraulic fluid 31 to enhance the load distributing characteristics of the body of resilient material by providing an even more uniform pressure distribution. The embodiment retains, however, an essential advantage of resilient material over hydraulic fluid alone in that by being entirely enclosed in the cavity 30 the fluid cannot leak out of the load member 17. As pointed out previously, the clearance between the plungers 11 and 12 and the tubular walls 21a only needs to be sufficiently small to prevent extrusion of the resilient material; the clearance would have to be much smaller to prevent leakage of hydraulic fluid.

FIG. 6 reveals a third embodiment of this invention in which the unitary thrust ring 7 has been replaced by a number of small circumferentially spaced thrust members 25 having base portions 26 and outwardly extending flanges 27. The thrust members 25 are secured to the fan casing 4 by means of bolts 10 adjacent the outer ends of the internal support struts of the fan structure. Plungers 11 and 12 are received in grooves 13 in the flanges 27 in the same manner as they are in the embodiments of FIGS. 2–5 and are seated in the load members 17 in the same manner. With this arrangement, a weight savings may be obtained in that a portion of the thrust ring 7 is eliminated while a thrust transmitting structure is retained adjacent each of the radial struts of the fan assembly.

It will occur to those skilled in the art that various changes and modifications can be made without departing from the spirit and scope of the present invention. For example, the multi-element plungers 12 could be replaced by single element plungers similar to the plungers 11 if it is found that initial adjustment is not necessary when assembling the thrust distributing mounting. It is also obvious that the thrust distributing mounting could be modified so as to transmit thrust loads only; additional structure would then have to be provided to carry other loads in a non-redundant fashion. Although the thrust-transmitting arrangements shown and described above are used with engines of the aft-fan type, it will be apparent that similar arrangements can be used to mount other types of engines. It also will be obvious that similar thrust-transmitting arrangements can be utilized in mounting engines at other locations on aircraft such as the undersurfaces of wing structures. It is intended to cover all such changes and modifications by the appended claims.

What I claim as new and desire to secure by Letters Patent of the United States is:

1. A thrust distributing mounting for connecting a jet propulsion engine to a supporting structure comprising:
   (a) mounting structure secured to and circumferentially disposed about the engine, said mounting structure projecting radially outward from the engine periphery,
   (b) a substantially closed load member circumferentially disposed about the engine, axially spaced from said mounting structure and attached to the supporting structure, said load member containing a force-transmitting medium and having a plurality of circumferentially spaced openings therein,
   (c) and a plurality of axially extending plungers contacting said mounting structure,
   (d) each of said plungers extending into contact with said force-transmitting medium through a corresponding one of said openings with a close sliding fit such that said force-transmitting medium is entirely enclosed within said load member,
   (e) whereby the thrust developed by the engine and transmitted to the supporting structure is distributed equally among said plungers and is thereby distributed in a substantially uniform manner about the engine periphery.

2. A thrust distributing mounting for connecting a jet propulsion engine supporting structure comprising:
   (a) a thrust ring mounted about the engine casing,
      (1) said ring having a circumferential flange,
   (b) a hollow ring-like member axially spaced from said flange and adapted to be rigidly attached to the supporting structure,
      (1) said member enclosing a body of force-transmitting material,
      (2) said member also having a plurality of spaced openings,
   (c) and a plurality of plungers spaced about said flange and extending axially of the casing,
   (d) said plungers being received through corresponding ones of said openings with a close sliding fit and seated in said force transmitting material,
   (e) whereby the thrust developed by the engine and transmitted to the supporting structure is distributed equally among said plungers and is thereby distributed in a substantially uniform manner about the circumference of the casing.

3. A thrust distributing mounting for connecting a jet propulsion engine to a supporting structure comprising:
   (a) a thrust ring mounted about the engine casing,
      (1) said ring having a circumferential flange,
   (b) a hollow ring-like member axially spaced from said flange and adapted to be attached to the supporting structure,
      (1) said member having a plurality of spaced openings,
   (c) a body of resilient material enclosed in said member, and
   (d) a plurality of plungers spaced about said flange and extending axially of said frame,
   (e) said plungers being received through corresponding ones of said openings with a close sliding fit and seated in said resilient material,
   (f) whereby the thrust developed by the engine and transmitted to the supporting structure is distributed equally among said plungers and is thereby distributed in a substantially uniform manner about the engine periphery.

4. A thrust distributing mounting as defined in claim 1 wherein:
   (a) each of said plungers is provided with a first portion and a second portion,
   (b) each of said first portions is received through a corresponding one of said openings in said member with a close sliding fit and seated in said resilient material,
   (c) and further including means for axially adjusting said first portions relative to said second portions.

5. A thrust distributing mounting for connecting a jet propulsion engine to a supporting structure comprising:

(a) a thrust ring mounted about the engine casing,
   (1) said ring having a circumferential flange,
(b) a hollow ring-like member axially spaced from said flange and adapted to be attached to the supporting structure,
   (1) said member having a plurality of spaced openings,
(c) a body of resilient material enclosed in said member, and
(d) said resilient material being formed with a ring-like cavity therein,
(e) said cavity being filled with a fluid,
(f) a plurality of plungers spaced about said flange and extending axially of said frame,
(g) said plungers being received through corresponding ones of said openings with a close sliding fit and seated in said resilient material,
(h) whereby the thrust developed by the engine and transmitted to the supporting structure is distributed equally among said plungers and is thereby distributed in a substantially uniform manner about the engine periphery.

6. A thrust distributing mounting for connecting a jet propulsion engine to a supporting structure comprising:
(a) a thrust ring mounted about the engine casing,
   (1) said ring having a circumferential flange,
(b) a first hollow ring-like member spaced axially forward from said flange and adapted to be attached to the supporting structure,
   (1) said first member having a plurality of spaced openings,
(c) a first body of resilient material enclosed in said first member,
(d) a second hollow ring-like member spaced axially aft from said flange and adapted to be rigidly attached to both said first member and the supporting structure,
   (1) said second member having a plurality of spaced openings,
(e) a second body of resilient material enclosed in said second member,
(f) a first plurality of plungers spaced about said flange and extending axially forward from said flange,
(g) said first plurality of said plungers being received through said openings in said first member with a close sliding fit and seated in said first body of resilient material, and
(h) a second plurality of plungers spaced about said flange and extending axially aft from said flange,
(i) said second plurality of plungers being received through said openings in said second member with a close sliding fit and seated in said second body of resilient material,
(j) whereby the thrust developed by the engine and transmitted to the supporting structure is distributed equally among said plungers and is thereby distributed in a substantially uniform manner about the engine periphery.

7. A thrust distributing mounting for connecting a jet propulsion engine to a supporting structure comprising:
(a) a thrust ring mounted about the engine casing,
   (1) said ring having a circumferential flange,
(b) a first hollow ring-like member spaced axially from said flange in a first direction and adapted to be attached to the supporting structure,
   (1) said first member having a plurality of spaced openings,
(c) a first body of resilient material enclosed in first said member,
(d) a second hollow ring-like member spaced axially from said flange in a second direction and adapted to be rigidly attached to both said first member and the supporting structure,
   (1) said second member having a plurality of spaced openings,
(e) a second body of resilient material enclosed in said second member,
(f) a first plurality of plungers spaced about said flange and extending axially therefrom in said first direction,
(g) each of said first plurality of plungers being received through a corresponding one of said openings in said first member with a close sliding fit and seated in said first body of resilient material,
(h) a second plurality of plungers spaced about said flange and extending axially therefrom in a second direction,
(i) each of said second plurality of plungers having a first portion and a second portion,
(j) each of said first portions being received through a corresponding one of said openings in said second member with a close sliding fit and seated in said second body of resilient material,
(k) means for axially adjusting each of said first portions relative to said second portions,
(l) and means for securing said portions together in said adjusted position,
(m) whereby the thrust developed by the engine and transmitted to the supporting structure is distributed equally among said plungers and is thereby distributed in a substantially uniform manner about the engine periphery.

8. A thrust distributing mounting for connecting a jet propulsion engine to a supporting structure comprising:
(a) a thrust ring mounted about the engine casing,
   (1) said ring having a circumferential flange,
(b) a first hollow toroidal member spaced axially from from said flange in a first direction and adapted to be attached to the supporting structure,
   (1) said first member having a plurality of spaced openings,
(c) a first body of resilient material enclosed in said first member,
(d) a second hollow toroidal member spaced axially from said flange in a second direction and adapted to be rigidly attached to both said first member and said supporting structure,
   (1) said second member having a plurality of spaced openings,
(e) a second body of resilient material enclosed in said second member,
(f) a first plurality of plungers spaced about said flange and extending axially therefrom in a first direction,
(g) each of said first plurality of plungers being received through a corresponding one of said openings in said first member with a close sliding fit and seated in said first body of resilient material,
(h) a second plurality of plungers spaced about said flange and extending axially therefrom in a second direction,
(i) each of said second plurality of plungers having a first screw-threaded portion,
(j) each of said second plurality of plungers further having a second screw-threaded portion,
   (1) each of said second portions having a threaded engagement with a corresponding one of said first portions for providing axial adjustment thereof,
   (2) each of said second portions being received through a corresponding of said openings in said second member with a close sliding fit and seated in said second body of resilient material,
(k) and a first nut mounted on each of said first portions to bear against said flange and a second nut mounted on each of said first portions to bear against a corresponding one of said second portions to hold said second portions in an adjusted position,
(l) whereby the thrust developed by the engine and transmitted to the supporting structure is distributed equally among said plungers and is thereby distributed in a substantially uniform manner about the engine periphery.

9. A thrust distributing mounting for connecting a jet propulsion engine to a supporting structure comprising:
 (a) a plurality of thrust members secured to and circumferentially spaced about the engine casing, said thrust members projecting radially outward from the casing,
 (b) a substantially closed load member circumferentially disposed about the casing, axially spaced from said thrust members and attached to the supporting structure, said load member containing a force-transmitting medium and having a plurality of circumferentially spaced openings therein,
 (c) and a plurality of axially extending plungers contacting said thrust members,
 (d) each of said plungers extending into contact with said force transmitting medium through a corresponding one of said openings with a close sliding fit such that said force transmitting medium is entirely enclosed within said load member,
 (e) whereby the thrust developed by the engine and transmitted to the supporting structure is distributed equally among said plungers and is thereby distributed in a substantially uniform manner about the circumference of the casing.

References Cited by the Examiner
UNITED STATES PATENTS

| | | | |
|---|---|---|---|
| 1,860,444 | 5/1932 | Woolson | 248—9 |
| 1,940,895 | 12/1933 | Wacker | 248—5 |
| 2,367,697 | 1/1945 | Stitz et al. | 248—5 |
| 2,891,743 | 6/1959 | Blioard et al. | 248—5 |

CLAUDE A. LE ROY, *Primary Examiner.*